US011562398B2

(12) United States Patent
Bugga et al.

(10) Patent No.: US 11,562,398 B2
(45) Date of Patent: Jan. 24, 2023

(54) ADVERTISEMENT NETWORKS

(71) Applicants: Sony Pictures Entertainment Inc., Culver City, CA (US); Sony Corporation, Tokyo (JP); CRACKLE, INC., Culver City, CA (US)

(72) Inventors: Shriyamvar Bugga, Culver City, CA (US); Kaigani Turner, Culver City, CA (US); Matia Wagabaza, Culver City, CA (US)

(73) Assignee: Crackle, Inc., Culver City, CA (US)

( * ) Notice: Subject to any disclaimer, the term of this patent is extended or adjusted under 35 U.S.C. 154(b) by 0 days.

(21) Appl. No.: 15/986,715

(22) Filed: May 22, 2018

(65) Prior Publication Data

US 2019/0362388 A1 Nov. 28, 2019

(51) Int. Cl.
*G06Q 30/00* (2012.01)
*G06Q 30/02* (2012.01)
*G05B 19/418* (2006.01)

(52) U.S. Cl.
CPC ..... *G06Q 30/0269* (2013.01); *G06Q 30/0277* (2013.01)

(58) Field of Classification Search
CPC .............. G06Q 30/0269; G06Q 30/0277
See application file for complete search history.

(56) References Cited

U.S. PATENT DOCUMENTS

| 6,978,270 B1 | 12/2005 | Carty et al. |
| 2002/0120515 A1 | 8/2002 | Morimoto et al. |
| 2007/0244750 A1* | 10/2007 | Grannan ................ G06Q 30/02 705/14.64 |
| 2016/0379256 A1 | 12/2016 | Salamon et al. |
| 2019/0188411 A1* | 6/2019 | Kroutik ............... G06F 21/6245 |
| 2019/0279257 A1* | 9/2019 | Kokernak .......... G06Q 30/0277 |

OTHER PUBLICATIONS

"Is Blockchain Ready to Revolutionize Online Advertising?". IEEE. 2018. (Year: 2018).*
"Interactive electronic advertising". IEEE. 1994. (Year: 1994).*
Coleman, Brave Browser Will Reward Users with Ethereum-Based Tokens for Switching on Ads; Bitcoin Technology; Mar. 23, 2017; 7 pages.
Papyrus Decentralized Advertising Ecosystem; Sep. 27, 2017; 46 pages.
Storm Token White Paper, Market Research, Network Development Plans, and Marketing Materials; CakeCodes Global SEZC, Inc.; Oct. 16, 2017; 20 pages.

* cited by examiner

*Primary Examiner* — Maria V Vanderhorst
(74) *Attorney, Agent, or Firm* — Procopio, Cory, Hargreaves & Savitch LLP

(57) ABSTRACT

Building and controlling access to a detailed profile of a consumer, including: generating the detailed profile of the consumer using a blockchain-based media ledger; enabling the consumer to subscribe to an advertisement network to control the access to the detailed profile of the consumer; recording consumptions and transactions of the consumer in the advertisement network as a media consumption history of the consumer; and ingesting the media consumption history into the blockchain-based media ledger. Keywords include blockchain, advertising, cryptographic token, and customer data.

15 Claims, 5 Drawing Sheets

ADVERTISEMENT NETWORKS

BACKGROUND

Field

The present disclosure relates to sharing consumer data, and more specifically, to generating a media ledger for sharing the consumer data.

Background

Currently, sharing of consumer data in a singular view, which provides an overview of the consumer data across different parts of a business, has been inadequate. For example, currently, it is difficult to recognize the consumer from one part of the business so that the consumer can be targeted and/or rewarded at another part of the business. Some approaches involved building and integrating a shared platform (e.g., a single sign on) or storing the consumer data in a shared database. However, these approaches do not provide good enough solutions, since the approaches are vulnerable to data breaches.

Businesses have tried targeted advertising by collecting consumer usage data. However, indiscriminate collection and use of the consumer usage data often leads to invasion of privacy issues when the data is mined and exploited without consent and/or compensation to the consumer. Further, untargeted advertisements are not only ineffective, but can be counterproductive since the consumer may perceive the advertisements as wasting time and leave the online site.

SUMMARY

The present disclosure includes an advertisement network that interfaces with a system for providing secure and accurate solutions for linking a media consumption history (including the consumption of advertisements) to accounts of a consumer of media products, services, and platforms.

In one implementation, a method for enabling a consumer to build and control access to a detailed profile of the consumer is disclosed. The method includes: generating the detailed profile of the consumer using a blockchain-based media ledger; enabling the consumer to subscribe to an advertisement network to control the access to the detailed profile of the consumer; recording consumptions and transactions of the consumer in the advertisement network as a media consumption history of the consumer; and ingesting the media consumption history into the blockchain-based media ledger.

In one implementation, the detailed consumer profile includes preferences for the media consumption history. In one implementation, the preferences include advertisers and publishers that may access the media consumption history of the consumer. In one implementation, the method further includes accessing the blockchain-based media ledger to target the consumer based on the preferences. In one implementation, the method further includes enabling the consumer to earn and spend cryptographic tokens. In one implementation, the method further includes selecting only the consumer who opted in to reveal the media consumption history. In one implementation, the method further includes analyzing aggregated audience data from combined consumption histories of all consumers.

In another implementation, a non-transitory computer-readable storage medium storing a computer program to enable a consumer to build and control access to a detailed profile of the consumer is disclosed. The computer program includes executable instructions that cause a computer to: generate the detailed profile of the consumer using a blockchain-based media ledger; enable the consumer to subscribe to an advertisement network to control the access to the detailed profile of the consumer; record consumptions and transactions of the consumer in the advertisement network as a media consumption history of the consumer; and ingest the media consumption history into the blockchain-based media ledger.

In one implementation, the detailed consumer profile includes preferences for the media consumption history. In one implementation, the preferences include advertisers and publishers that may access the media consumption history of the consumer. In one implementation, the non-transitory computer-readable storage medium further includes executable instructions that cause the computer to access the blockchain-based media ledger to target the consumer based on the preferences. In one implementation, the non-transitory computer-readable storage medium further includes executable instructions that cause the computer to enable the consumer to earn and spend cryptographic tokens. In one implementation, the non-transitory computer-readable storage medium further includes executable instructions that cause the computer to select only the consumer who opted in to reveal the media consumption history. In one implementation, the non-transitory computer-readable storage medium further includes executable instructions that cause the computer to analyze aggregated audience data from combined consumption histories of all consumers.

In yet another implementation, a system includes: a detailed profile of a consumer generated using a blockchain-based media ledger; and an advertisement network configured to control the access to the detailed profile of the consumer, the advertisement network also configured to record consumptions and transactions of the consumer in the advertisement network as a media consumption history of the consumer, wherein the media consumption history is ingested into the blockchain-based media ledger.

In one implementation, the detailed consumer profile comprises preferences for the media consumption history. In one implementation, the preferences include advertisers and publishers that may access the media consumption history of the consumer. In one implementation, the advertisement network includes an advertising unit and a publishing unit. In one implementation, the publishing unit is configured to reward the consumer with cryptographic tokens for consuming or making transactions with the media of the publishing unit. In one implementation, the advertising unit is configured to analyze aggregated audience data from combined consumption histories of consumers.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1A:
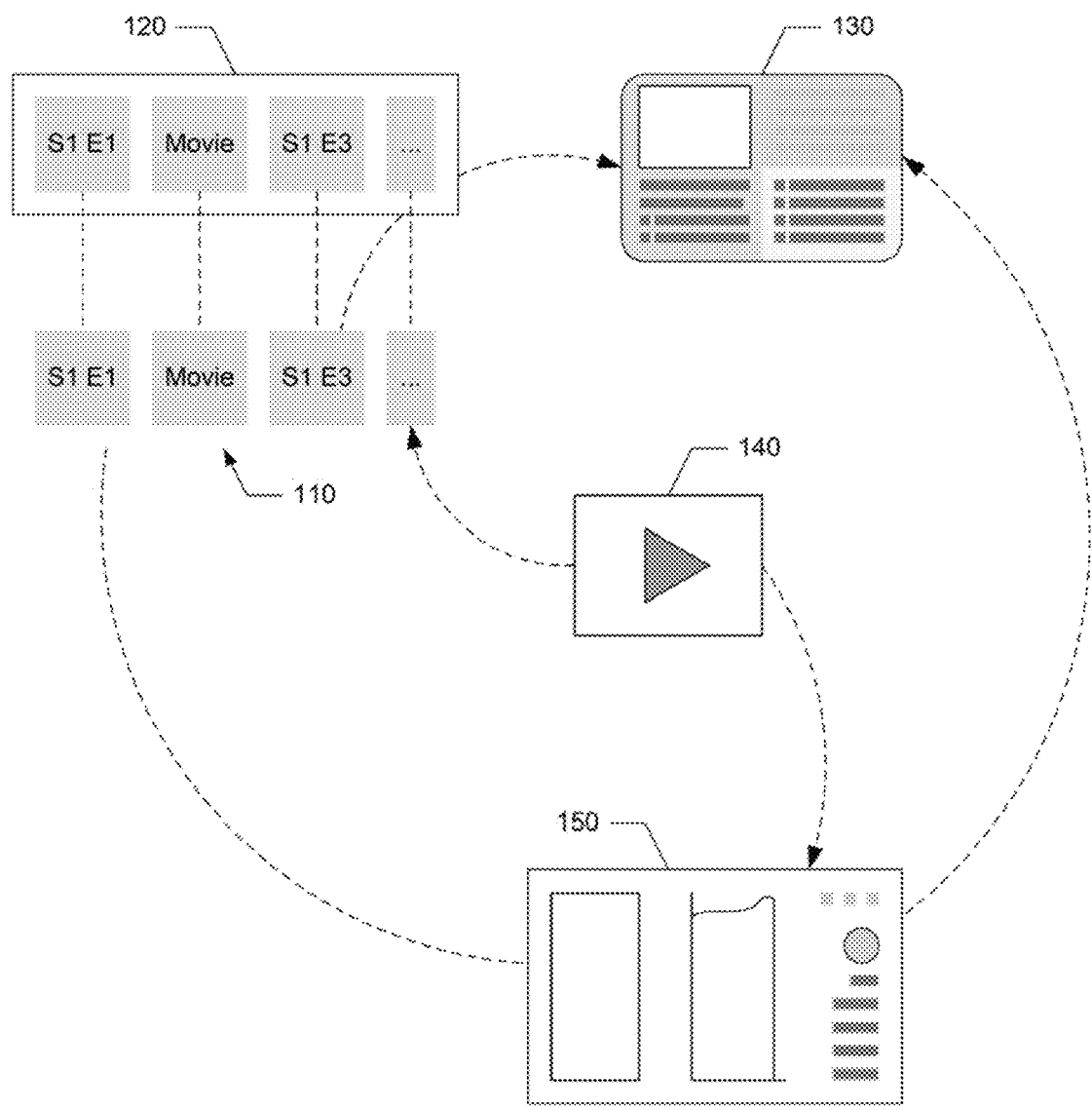
FIG. 1A is an overview diagram of a system for linking a media consumption history to an account of the consumer using a blockchain-based media ledger in accordance with one implementation of the present disclosure.

Certain implementations of the present disclosure includes an advertisement network that interfaces with a system for providing secure and accurate solutions for linking a media consumption history (including the consumption of advertisements) to accounts of a consumer of media products, services, and platforms. The system provides a single view of the consumer across the media services and platforms using a blockchain-based media ledger. In one implementation, the advertisement network enables the consumer to define the rules for advertising experience within the media services and platforms. Although the specification describes an advertisement network, the description of the advertisement network applies equally to other networks such as a marketing network.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, when a consumer consumes media and transacts with the digital rights management (DRM), the consumption and the transaction are recorded on a media ledger using metadata. The metadata is encrypted and preserved on a digital blockchain and shared across different parts of the business (i.e., services and platforms). Thus, a complete history of the consumer's media consumption habits (e.g. videos watched, music listened to, and/or advertisements viewed) is recorded on the digital blockchain. In another implementation, the service provider hosts media on a distributed media ledger.

Since the consumer owns the data stored in the blockchain, the consumer can decide to reveal only the relevant data to the advertisement network in return for cryptographic tokens (or token rewards). The cryptographic tokens exist conceptually as entries on the blockchain-based media ledger. The tokens are applied to keys that allow creation of a new entry on the media ledger and reassign the ownership to someone else. Thus, the tokens enable the consumer to control and manage digital resources.

In one implementation, the tokens are applied to the consumer's private key, which is associated with a digital wallet. The tokens are generated from the interaction between the DRM and the blockchain using a proof-of-engagement algorithm that involves consumer participation to determine the yield or amount of the token rewards. The generated tokens are used as a reward/payment by the advertisement network to the consumer for sharing the media consumption history.

In one implementation, the private key owned by the consumer is encrypted as a personal history stored on the media ledger blockchain and the blockchain can be moved freely between providers without necessitating a login or registration. The consumer can reveal as much or as little data as the consumer sees fit in the value exchange for how the data is being used.

FIG. 1A is an overview diagram of a system 100 for linking a media consumption history 110 to an account of the consumer using a blockchain-based media ledger 120 in accordance with one implementation of the present disclosure. In the illustrated implementation of FIG. 1A, the system 100 includes the media consumption history 110, the media ledger 120, a consumer profile 130, and an advertisement network 150 including a media and advertisement consumption playback 140. The advertisement network 150 enables the consumer to define the rules for advertising experience.

In one implementation, the advertisement network 150 enables the consumer to: (1) build a detailed profile that includes preferences for the media and the advertisement; (2) control access to the detailed profile of the consumer by specifying, for example, which publishers and/or advertisers may access the preferences to personalize the experience; (3) earn cryptographic tokens or points by consuming and/or making transactions with the media (e.g. watching videos, listening to music, and/or viewing advertisements); and (4) spend the tokens or points to further control the consumer experience (e.g., spend the tokens to reduce the number of advertisements or use the tokens on playing online games).

In another implementation, the advertisement network 150 enables the advertiser to: (1) get the highest return on the advertisement spending by reaching out to the consumers who opted in to reveal their media consumption histories; (2) lower the operational costs to reach the relevant consumers; (3) combat advertisement blockers by advertising only to the consumers who opted in to receive the advertisement that are relevant to the consumers; and (4) access the media ledgers to target specific consumers based on their preferences revealed on the profiles (e.g., a first person shooter gamer, tech enthusiast, or a pet lover). In a further implementation, the advertisement network 150 enables the media publisher to: (1) improve user retention and loyalty by substantially reducing invasive advertising and improving performance; and (2) increase the revenue due from the increased value of the audience.

In one implementation, the media ledger 120 is configured to ingest the media consumption history 110 of the consumer from a content catalog of the DRM. Using the media ledger 120, the consumer creates the profile 130, subscribes to the advertisement network 150, and controls access to the media consumption history data 110 in the media ledger 120. Thus, when the consumer consumes media and transacts with the DRM, the consumption and the transaction are recorded on the media ledger 120 using metadata. The metadata is encrypted and preserved on a digital blockchain and shared across different parts of the business (i.e., services and platforms). Accordingly, a complete history of the consumer's media consumption habits (e.g. videos watched, music listened to, and/or advertisements viewed) is recorded on the digital blockchain. Since the consumer owns the data (e.g., the media ledger 120) stored in the blockchain, the consumer can decide to reveal only the data the consumer is willing to reveal to the advertisement network 150 in return for tokens earned through the reward unit 140.

In one implementation, the tokens are applied to the consumer's private key in the blockchain, which is associated with a digital wallet. The tokens are generated from the interaction between the media ledger 120 and the blockchain using a proof-of-engagement algorithm that involves consumer participation to determine the yield of the token rewards. In one implementation, the private key owned by the consumer is encrypted as a personal history stored on the media ledger blockchain and the blockchain can be moved freely between providers without necessitating a login or registration. The consumer can reveal as much or as little data as the consumer sees fit in the value exchange for how the data is being used.

The blockchain data structure is an ordered list of blocks. Each block points back to its predecessor until the first block, which is sometimes referred to as the genesis block. The blocks and their sequencing are protected in integrity by backward-linking of cryptographic hashes. There are many blockchains and usage of blockchains, but the most famous ones are Bitcoin and Ethereum.

Figure 1B:
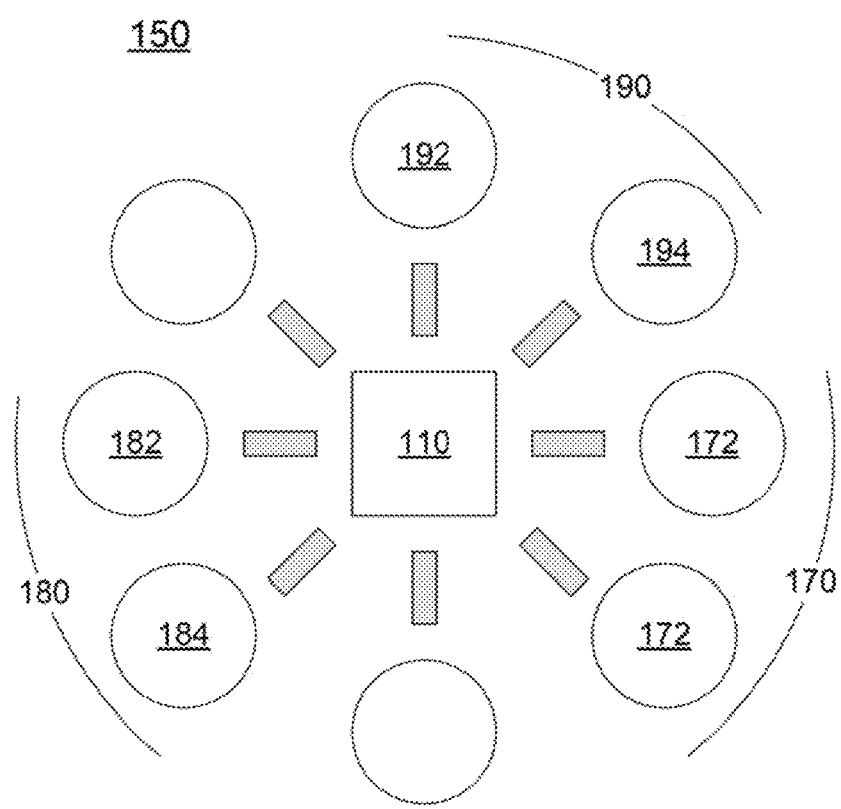
FIG. 1B is an overview diagram of the advertisement network included in the system for linking a media consumption history to an account of the consumer in accordance with one implementation of the present disclosure.

FIG. 1B is an overview diagram of the advertisement network 150 included in the system 100 for linking a media consumption history 110 to an account of the consumer in accordance with one implementation of the present disclosure. The overview diagram of FIG. 1B shows the advertisement network 150 as a media ledger centralized network. In the illustrated implementation of FIG. 1B, the advertisement network 150 is configured to interface with the media ledger 120 to satisfy the needs of the consumer 170, the media publishing unit 180, and the advertising unit 190.

In one implementation, as stated above, the advertisement network 150 enables the consumer 170 to: (1) build a detailed user profile 172 (e.g., the profile 130 of FIG. 1A) that includes preferences 174 for the media and the advertisement; (2) control access to the detailed profile 172 of the consumer 170 by specifying, for example, which publishing unit 180 and/or advertising unit 190 may access the preferences 174 to personalize the experience; (3) earn cryptographic tokens or points by consuming and/or making transactions with the media (e.g. watching videos, listening to music, and/or viewing advertisements); and (4) spend the tokens or points to further control the consumer experience (e.g., spend the tokens to reduce the number of advertisements or use the tokens on playing online games).

In one implementation, as stated above, the advertisement network 150 enables the advertising unit 190 to: (1) get the highest return on the advertisement spending by reaching out to the consumers 170 who opted in to reveal their media consumption histories through an advertisement exchange 192; (2) lower the operational costs to reach the relevant consumer 170; (3) combat advertisement blockers by advertising only to the consumer 170 who opted in to receive the advertisement that are relevant to the consumer 170; (4) access the media ledger 120 to target specific consumers based on their preferences revealed on the profiles 172 (e.g., a first person shooter gamer, tech enthusiast, or a pet lover); and (5) analyze aggregated audience data 194 from the combined consumption histories of all the consumers.

In one implementation, as stated above, the advertisement network 150 enables the media publishing unit 180 to: (1) improve user retention and loyalty by substantially reducing invasive advertising and improving performance; and (2) increase the revenue due from the increased value of the audience. In the illustrated implementation of FIG. 1B, the media publishing unit 180 manages a content catalog 182 which includes a catalog of all contents owned by the media publisher. The media publishing unit 180 also stores the media consumption history 184 (e.g., the media consumption history 110 of FIG. 1A) of the consumer 170. When the consumer 170 consumes media or makes a transaction, the consumption or the transaction is recorded on the media consumption history 184 and is ingested into the media ledger 120.

Figure 2:
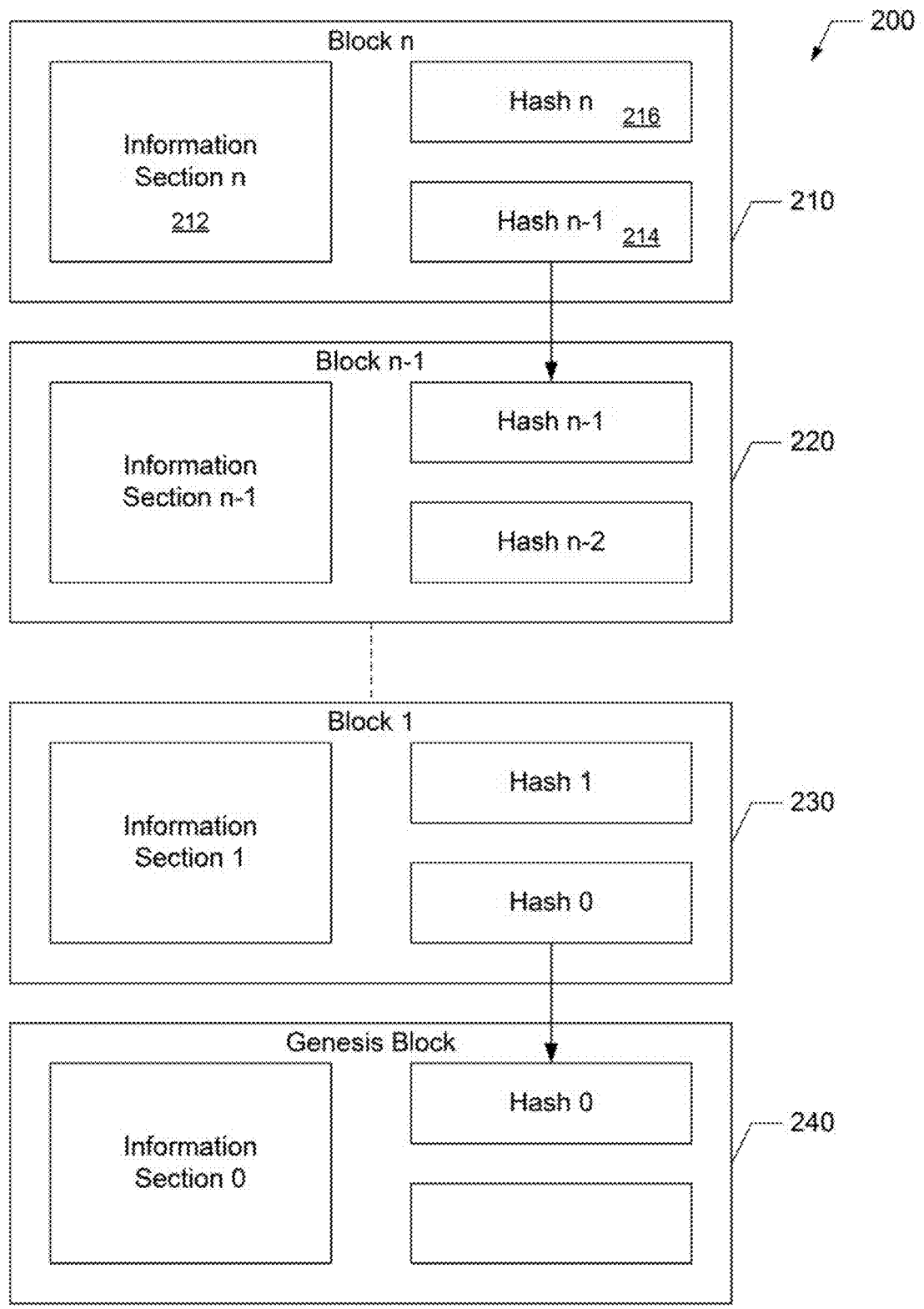
FIG. 2 is a block diagram of a blockchain including n blocks and a genesis block.

FIG. 2 is a block diagram of a blockchain 200 including n blocks 210, 220, 230 and a genesis block 240. In one implementation, a block has at least three elements: (a) an information section (e.g., 212) that stores the registered data and ancillary data, wherein the information section may be signed to prove its authenticity; (b) the cryptographic hash (e.g., 214) of the previous block (the genesis block will not have a previous block); and (c) the cryptographic hash (e.g., 216) of the current block. Thus, the data structure of the blockchain provides an append-only global log, which is tamper evident.

Figure 3:
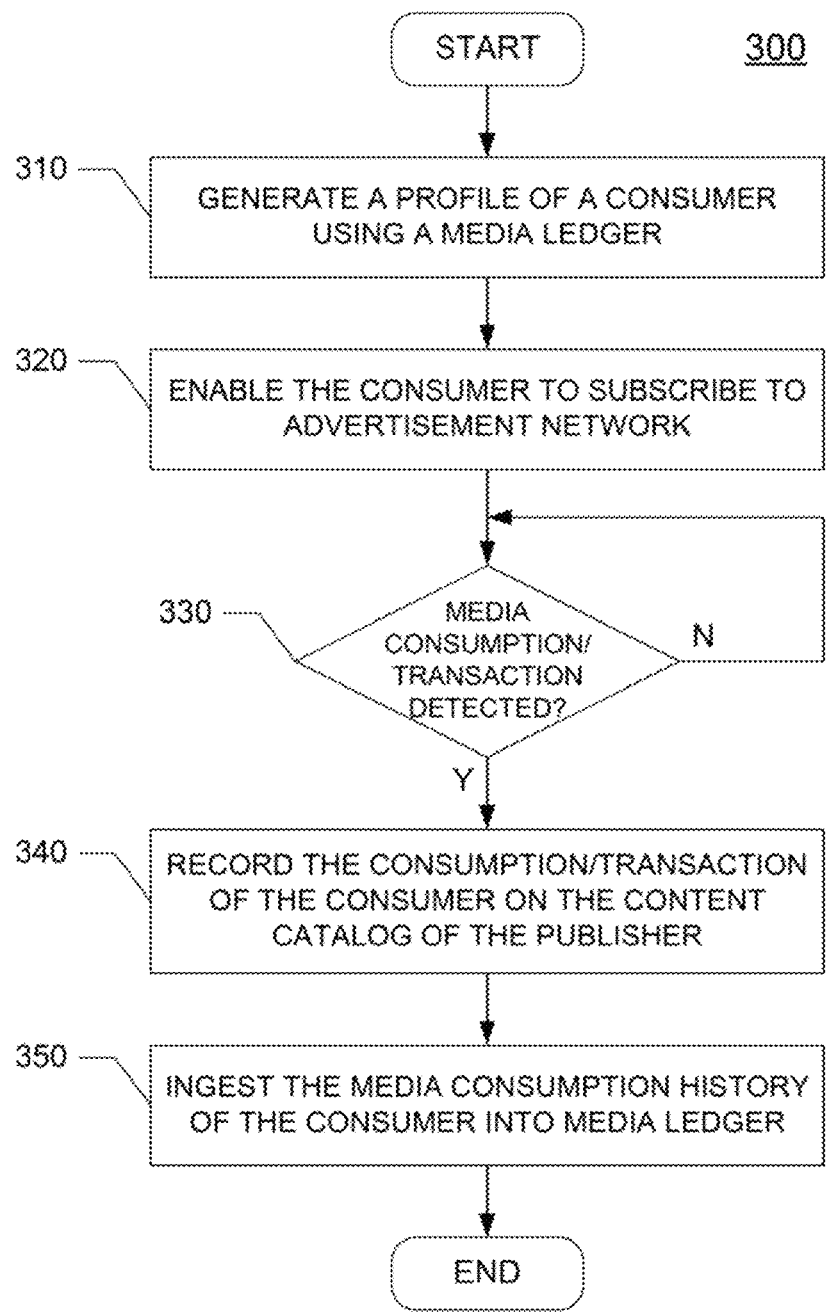
FIG. 3 is a flow diagram of a process for enabling a consumer to build a detailed consumer profile in accordance with one implementation of the present disclosure.

FIG. 3 is a flow diagram of a process 300 for enabling a consumer to build a detailed consumer profile in accordance with one implementation of the present disclosure. In one implementation, the detailed consumer profile includes preferences for the media and the advertisement stored as a media consumption history, which is linked to a consumer using a blockchain-based media ledger.

In the illustrated implementation of FIG. 3, a detailed profile of the consumer is generated, at step 310, using a media ledger. The creation of the detailed consumer profile, at step 310, enables the consumer to subscribe to an advertisement network, at step 320, to control the access to the consumer profile which includes the preferences for the media and the advertisement. In one implementation, the detailed consumer profile includes which publisher and/or advertiser may access the preferences to personalize the consumer experience. Subsequently, when the consumer consumes media and transacts with the publisher, at step 330, the consumptions and/or the transactions of the consumer in the advertisement network are recorded on the content catalog of the publisher, at step 340. Further, the media consumption history of the consumer is ingested, at step 350, into the media ledger from the content catalog of the publisher.

Figure 4:
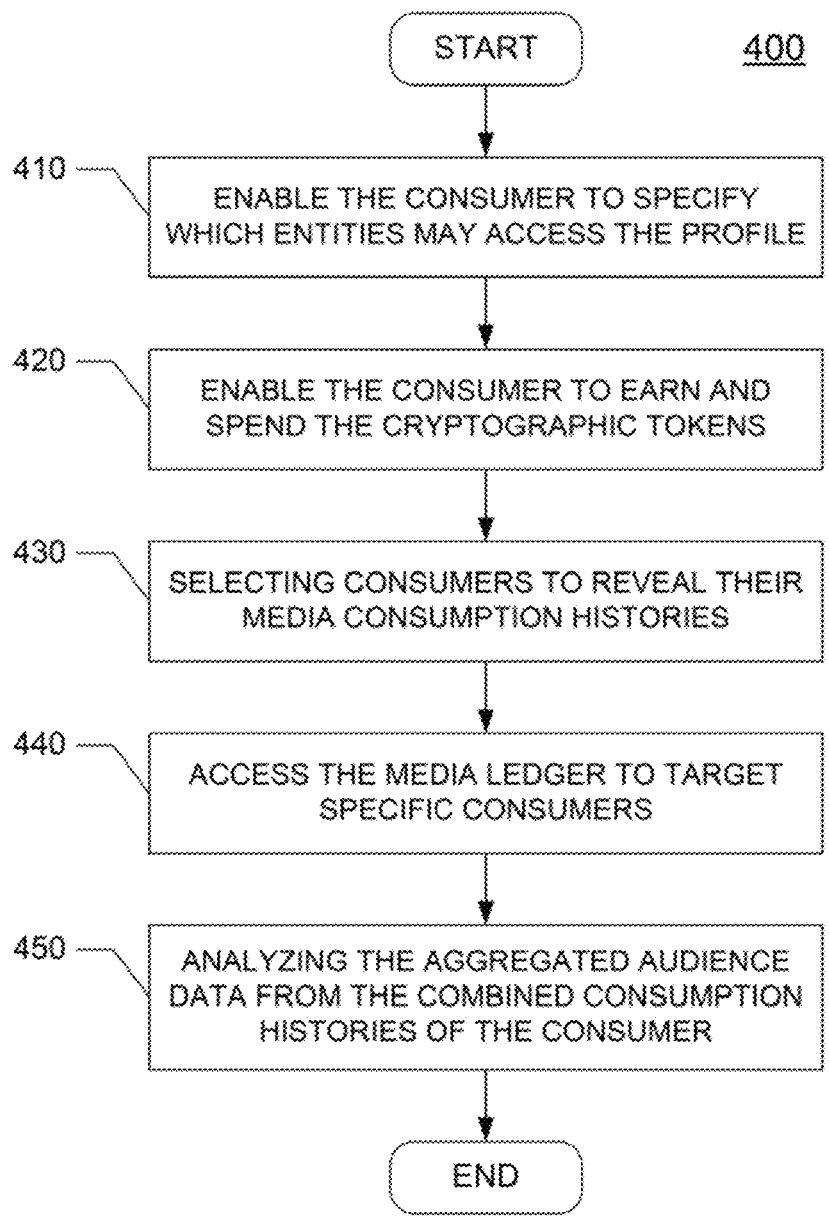
FIG. 4 is a flow diagram of a process for enabling a consumer and an advertiser to control access to a detailed consumer profile in accordance with one implementation of the present disclosure.

FIG. 4 is a flow diagram of a process 400 for enabling a consumer and an advertiser to control access to a detailed consumer profile in accordance with one implementation of the present disclosure.

In one implementation, controlling the access includes enabling the consumer to specify, at step 410, which entities (e.g., publishers and/or advertisers) may access the preferences in the profile to personalize the consumer experience. In another implementation, controlling the access includes enabling the consumer to earn and spend the cryptographic tokens, at step 420. In another implementation, controlling the access includes the advertiser reaching out and selecting only the consumers who opted in to reveal their media consumption histories, at step 430, to get the highest return on the advertisement spending, to lower the operational costs to reach the relevant consumer, and to combat advertisement blockers. In another implementation, controlling the access includes the advertiser accessing the media ledger of the consumer, at step 440, to target specific consumers based on their preferences revealed on the profiles. In another implementation, controlling the access includes the advertiser analyzing aggregated audience data from the combined consumption histories of all the consumers, at step 450.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, although the specification describes consuming or publishing media, the description of the consumption or publishing of media applies equally to any type of content including non-media content such as event(s). Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for enabling a consumer to build and control access to a detailed profile of the consumer in a media ledger based on a blockchain such that the detailed profile of the consumer can be shared across different parts of a business and with advertisers, the method comprising:

generating, at an advertisement network processor, the detailed profile of the consumer using the blockchain-based media ledger to target the consumer based on preferences for media and advertisements, wherein the detailed profile includes the preferences for the media and the advertisements;

controlling access to the detailed profile of the consumer by defining rules for the advertisers, wherein tokens are generated from an interaction between an advertisement network and the blockchain using a proof-of-engagement technique that determines an amount of the tokens to be rewarded to the consumer based on participation of the consumer, wherein a new entry is created on the blockchain-based media ledger to reassign an ownership of the detailed profile of the consumer to the advertisers by applying the rewarded tokens to a private key of the consumer, which is associated with a digital wallet of the consumer, wherein the advertisement network interfaces with a system for providing solutions for linking a media consumption history to accounts of the consumer of media products, services, and platforms;

recording, at the advertisement network processor, consumptions and transactions of the consumer in the advertisement network as the media consumption history of the consumer on the blockchain-based media ledger using metadata that is encrypted and preserved on a blockchain;

ingesting, at an advertisement network processor, the media consumption history into the blockchain-based media ledger;

sharing the detailed profile of the consumer across different parts of the business and with the advertisers using the blockchain-based media ledger; and accessing the blockchain-based media ledger to target the relevant consumers based on the preferences revealed on the profiles.

2. The method of claim 1, wherein the preferences include the advertisers and publishers that may access the media consumption history of the consumer.

3. The method of claim 1, further comprising
enabling, by the advertisement network processor, the consumer to earn and spend cryptographic tokens.

4. The method of claim 1, further comprising
selecting, by the advertisement network processor, only the consumer who opted in to reveal the media consumption history.

5. The method of claim 1, further comprising
analyzing, at the advertisement network processor, aggregated audience data from combined consumption histories of all consumers.

6. A non-transitory computer-readable storage medium storing a computer program to enable a consumer to build and control access to a detailed profile of the consumer in a media ledger based on a blockchain such that the detailed profile of the consumer can be shared across different parts of a business and with advertisers, the computer program comprising executable instructions that cause a computer to:

generate and store the detailed profile of the consumer in the storage medium using the blockchain-based media ledger to target the consumer based on preferences for media and advertisements, wherein the detailed profile includes the preferences for the media and the advertisements;

control access to the detailed profile of the consumer stored in the storage medium by defining rules for the advertisers, wherein tokens are generated from an interaction between an advertisement network and the blockchain using a roof-of-engagement technique that determines an amount of the tokens to be rewarded to the consumer based on participation of the consumer, wherein a new entry is created on the blockchain-based media ledger to reassign an ownership of the detailed profile of the consumer to the advertisers by applying the rewarded tokens to a private key of the consumer, which is associated with a digital wallet of the consumer, wherein the advertisement network interfaces with the storage medium for providing solutions for linking a media consumption history to accounts of the consumer of media products, services, and platforms;

record consumptions and transactions of the consumer in the advertisement network as the media consumption history of the consumer stored in the storage medium on the blockchain-based media ledger using metadata that is encrypted and preserved on a blockchain;

ingest the media consumption history into the blockchain-based media ledger;

share the detailed profile of the consumer across different parts of the business and with the advertisers using the blockchain-based media ledger; and access the blockchain-based media ledger to target the relevant consumers based on the preferences revealed on the profiles.

7. The non-transitory computer-readable storage medium of claim 6, wherein the preferences include the advertisers and publishers that may access the media consumption history of the consumer.

8. The non-transitory computer-readable storage medium of claim 6, further comprising executable instructions that cause the computer to enable the consumer to earn and spend cryptographic tokens.

9. The non-transitory computer-readable storage medium of claim 6, further comprising executable instructions that cause the computer to select only the consumer who opted in to reveal the media consumption history.

10. The non-transitory computer-readable storage medium of claim 6, further comprising executable instructions that cause the computer to analyze aggregated audience data from combined consumption histories of all consumers.

11. A system comprising:

a storage device configured to store a detailed profile of a consumer generated using a blockchain-based media ledger;

an advertisement network processor configured to control access to the detailed profile of the consumer, the advertisement network processor also configured to record consumptions and transactions of the consumer in the storage device as a media consumption history of the consumer, wherein the advertisement network processor interfaces with the system for providing solutions for linking the media consumption history to accounts of the consumer of media products, services, and platforms, wherein the solutions include:

generating the detailed profile of the consumer using the blockchain-based media ledger to target the consumer based on preferences for media and advertisements, wherein the detailed profile includes the preferences for the media and the advertisements;

controlling access to the detailed profile of the consumer by defining rules for the advertisers, wherein tokens are generated from an interaction between an advertisement network and the blockchain using a proof-of-engagement technique that determines an amount of the tokens to be rewarded to the consumer based on participation of the consumer, wherein a new entry is created on the blockchain-based media ledger to reassign an ownership of the detailed profile of the consumer to the advertisers by applying the rewarded tokens to a private key of the consumer, which is associated with a digital wallet of the consumer;

recording consumptions and transactions of the consumer in the advertisement network as the media consumption history of the consumer on the blockchain-based media ledger using metadata that is encrypted and preserved on a blockchain;

accessing the blockchain-based media ledger to target the relevant consumers based on the preferences revealed on the profiles;

wherein the media consumption history is ingested into the blockchain-based media ledger, wherein the detailed profile of the consumer is shared across different parts of the business and with the advertisers using the blockchain-based media ledger.

12. The system of claim 11, wherein the preferences include the advertisers and publishers that may access the media consumption history of the consumer.

13. The system of claim 11, wherein the advertisement network processor includes an advertising unit and a publishing unit.

14. The system of claim 13, wherein the publishing unit is configured to reward the consumer with cryptographic tokens for consuming or making transactions with the media of the publishing unit.

15. The system of claim 13, wherein the advertising unit is configured to analyze aggregated audience data from combined consumption histories of consumers.

* * * * *